United States Patent [19]
Jones et al.

[11] Patent Number: 5,140,128
[45] Date of Patent: Aug. 18, 1992

[54] METHOD AND SYSTEM FOR PROVIDING ELEMENTS OF COMPOSITE OBJECTS

[75] Inventors: Marshall G. Jones; Yung S. Liu, both of Scotia, N.Y.; Robert C. Dellert, Greendale, Wis.

[73] Assignee: General Electric Company, Schenectady, N.Y.

[21] Appl. No.: 729,860

[22] Filed: Jul. 12, 1991

Related U.S. Application Data

[63] Continuation of Ser. No. 518,392, May 3, 1990, abandoned.

[51] Int. Cl.$^5$ .............................................. B23K 26/00
[52] U.S. Cl. ............................ 219/121.72; 219/121.82
[58] Field of Search .................... 219/121.67, 121.72, 219/121.6, 121.82, 121.85, 121.74, 121.75, 121.76; 356/400, 401

[56] References Cited

U.S. PATENT DOCUMENTS

| | | | |
|---|---|---|---|
| 4,356,376 | 10/1982 | Komanduri et al. | 219/121 LN |
| 4,434,416 | 2/1984 | Schonberger | 219/121.67 X |
| 4,535,220 | 8/1985 | Callis et al. | 219/121.85 |
| 4,564,736 | 1/1986 | Jones et al. | 219/121 L |
| 4,673,795 | 6/1987 | Ortiz, Jr. | 219/121 L |
| 4,676,586 | 6/1987 | Jones et al. | 219/121.67 X |
| 4,681,396 | 7/1987 | Jones | 350/96.18 |
| 4,713,518 | 12/1987 | Yamazaki et al. | 219/121.69 |
| 4,720,426 | 1/1988 | Englert et al. | 428/344 |
| 4,724,298 | 2/1988 | Hawkins et al. | 356/400 X |
| 4,739,162 | 4/1988 | Ortiz, Jr. et al. | 250/227 |
| 4,764,485 | 8/1988 | Loughran et al. | 219/121.67 X |
| 4,799,755 | 1/1989 | Jones | 350/96.18 |
| 4,877,175 | 10/1989 | Jones et al. | 219/121.83 X |
| 4,940,878 | 7/1990 | McKee et al. | 219/121.64 |

*Primary Examiner*—C. L. Albritton
*Attorney, Agent, or Firm*—James R. McDaniel; James C. Davis, Jr.; Paul R. Webb, II

[57] ABSTRACT

An apparatus and method for processing a composite object, the method comprising the steps of providing a composite object, aligning a laser source with a portion of the composite object to be processed, operating the laser source to generate laser beam pulses, and forming composite object elements by applying the pluses of beams from the source to the composite object portion to be processed.

7 Claims, 4 Drawing Sheets

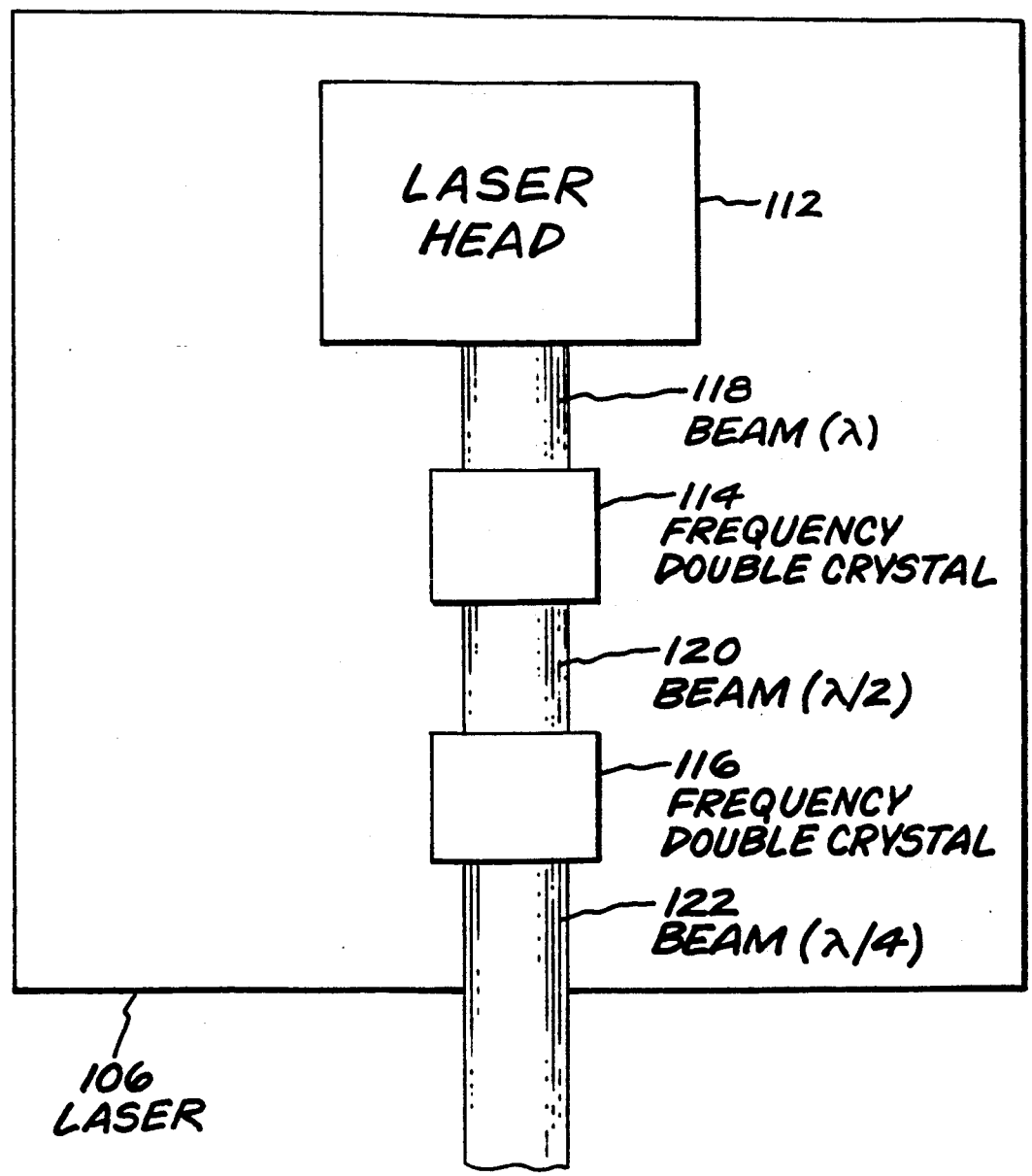

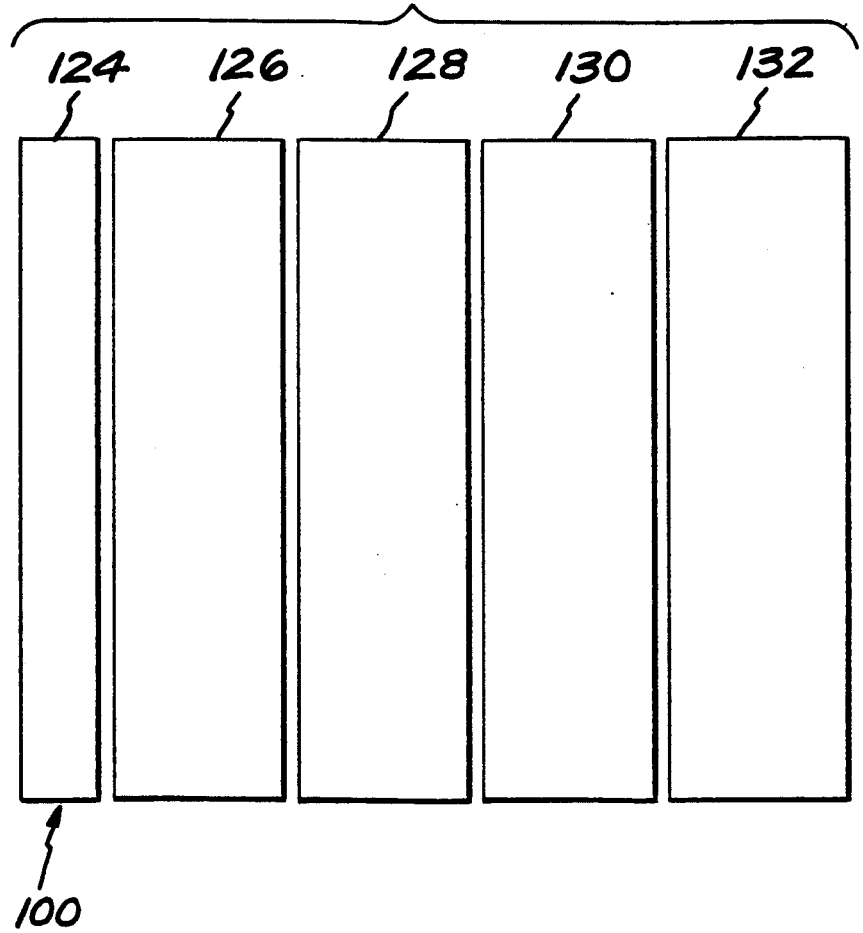
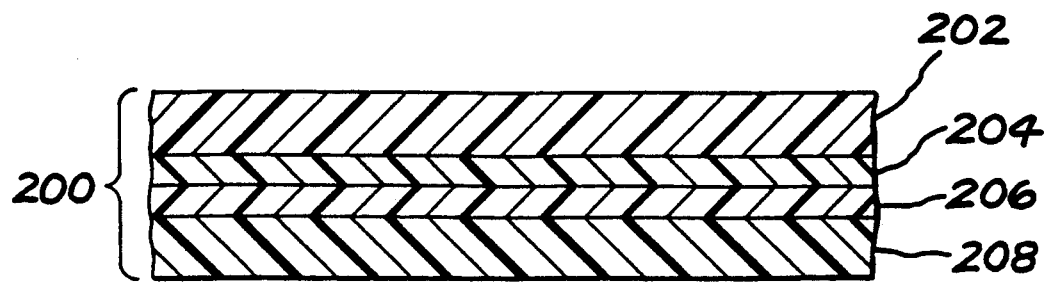

METHOD AND SYSTEM FOR PROVIDING ELEMENTS OF COMPOSITE OBJECTS

This application is a continuation of application Ser. No. 518,392 filed May 3, 1990, now abandoned.

The present invention relates to laser materials processing, and more specifically, to a system for laser materials processing of composite objects.

BACKGROUND OF THE INVENTION

Laser materials processing as known in the art and used herein refers to performance of materials processes, such as cutting, welding, drilling, heat treating and soldering, using a laser beam. Typically, the average power of such a laser beam may range from as little as less than one watt to thousands of watts, the specific power being selected on the basis of the particular process being performed. Laser beam power required for materials processing generally is much greater than laser beam power required for other laser based systems such as communication systems.

Before now, in spite of advances in laser technology, performing operations on composite objects such as cutting had to be performed manually using mechanical tools such as razor blades. The term composite object, as used herein, refers to an object typically composed of combinations of materials such as metal alloys and/or plastics, usually with the addition of strengthening agents. The term composite object element, as used herein, refers to a section of the composite object formed by performing a laser cutting operation on the composite object. For example, a composite object may be cut in halves by a laser beam to form two composite object elements. One type of composite object is a layered composite object wherein each layer has respective optical, mechanical and thermal properties. These variations in properties between the layers, until now, prevented laser materials processing of layered composite objects to provide composite object elements.

For example, when attempting to perform a laser materials processing operation on a layered composite object, a beam power level sufficient to process one layer may not be sufficient to process another layer. Increasing the beam power level, however, may result in damaging the first layer. Damaging a layer of a layered composite object is undesirable because such damage typically requires that the composite object be discarded. This, of course, leads to waste and increased costs.

In performing laser materials processing, it is known to use a neodymium:Yttrium-Aluminum Garnet (Nd:YAG) laser operating in a pulsed mode. An Nd:YAG laser is a source of 1.06 micrometer wavelength energy. It is also known to transmit a beam from a laser through an optical fiber to an output coupler. Further, it is known to alter the frequency/wavelength of a beam from a laser. Until now, however, there is no known control system for controlling laser materials processing of composite objects.

When controlling laser processing of composite objects, it is preferred that such control be automated so that advantages of using a laser based system are not lost. Specifically, one advantage of utilizing laser materials processing systems is a reduction in processing time. If a control systems results in substantially increasing the time period required to complete processing, the time saving advantage of using a laser system may be lost.

It is therefore an object of the present invention to provide a laser materials processing system for processing composite objects.

SUMMARY OF THE INVENTION

The present method and system for laser materials processing a composite object utilizes a laser source operating in a pulse mode to generate pulses of beams to be applied to the composite object. More specifically, the present method includes the steps of providing a composite object, aligning the laser source with a portion of the composite object to be processed, operating the laser source to generate laser beam pulses, and applying the pulses of beams from the source to the composite object portion to be processed to provide composite object elements. The wavelength of a beam emitted from the laser source, the pulse repetition rate, the power density of the focused beam, and the average power level of the beam may be selected and controlled on the basis of the composite object to be processed.

The present invention includes a computer-based controller, and such automated controller not only facilitates preserving advantages of using laser based system, but also further automates a processing operation leading to even further reductions in processing time. Specifically, an IBM 386 PC may be interfaced with and used to control an X-Y translation table for controlling movement of the composite object under the focused laser beam. One such translation table is available from Anorad Corp., Hauppauge, N.Y.

The present invention provides that a composite object may be processed utilizing a laser beam and facilitates more automated processing of composite objects. Further, the present invention performs laser materials processing on composite objects without damaging the composite object.

BRIEF DESCRIPTION OF THE DRAWINGS

These and other objects of the present invention, together with further features and advantages thereof, will be apparent from the following detailed specification when read together with the accompanying drawings, in which:

FIG. 2 is a more detailed block diagram of the laser source shown in FIG. 1;

FIG. 3 illustrates a composite object which has been processed to form a plurality of composite object elements;

FIG. 4 illustrates an example of a layered composite object; and

DETAILED DESCRIPTION OF THE DRAWINGS

Figure 1:
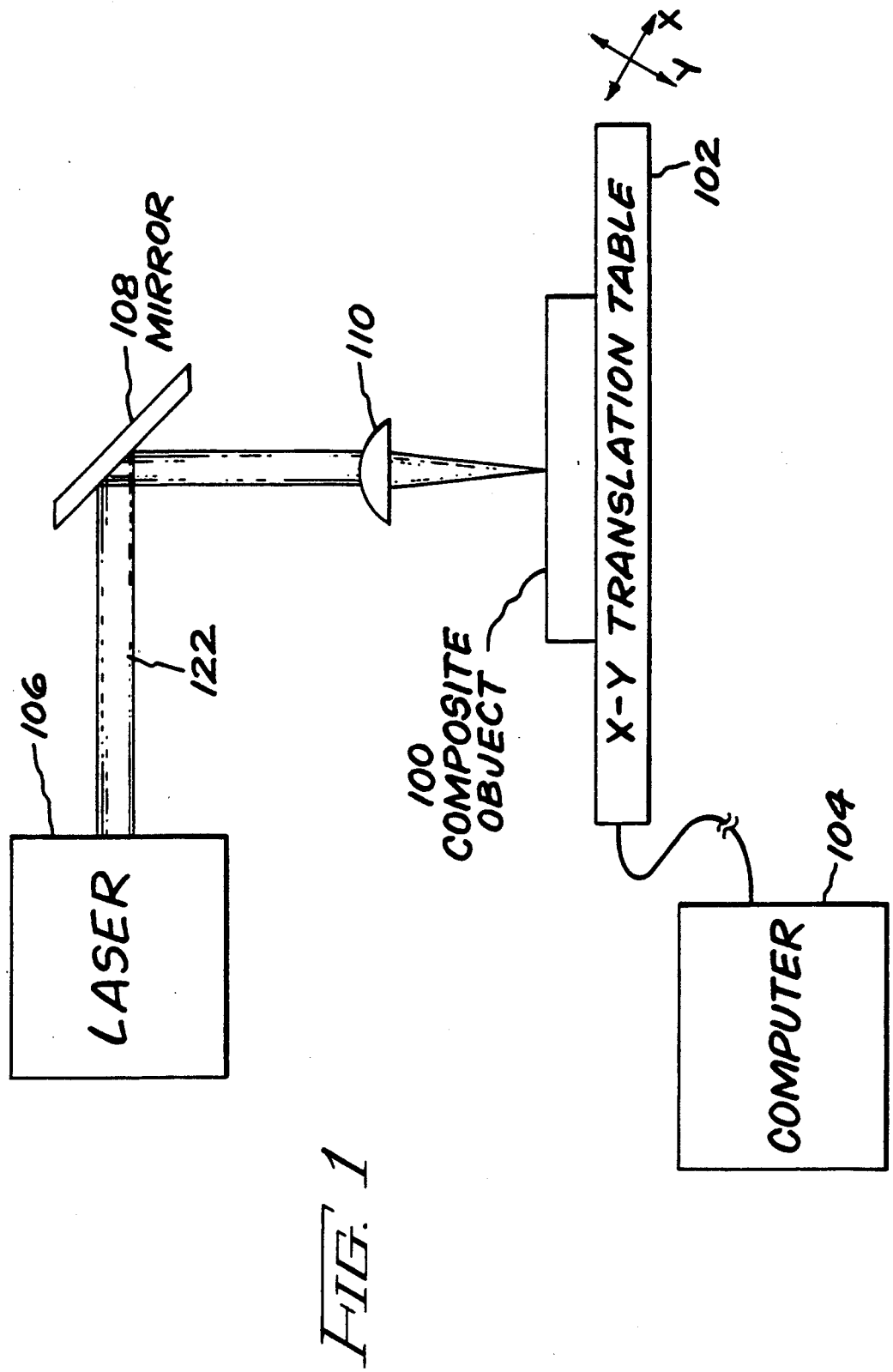
FIG. 1 illustrates, in block diagram, a first embodiment of the present processing system operating to process a composite object.

FIG. 1 illustrates a first embodiment of a processing system in accordance with the present invention. The processing system is shown operating so as to process a composite object 100. An X-Y translation table 102, controlled by a computer 104 as is well known in the art, is used to control movement of the composite object. For example, computer 104 may be an IBM 386 PC and X-Y translation table 102 may be one commercially available from Anorad Corp., Hauppauge, N.Y. The connections between the table and the computer are well known in the art. The present apparatus includes a laser 106, a reflecting mirror 108, and a focusing lens 110. Mirror 108 and focusing lens 110 are shown for illustrative purposes only. Focusing a beam from laser 106 onto a composite object may be achieved using a variety of lens and/or mirror combinations.

FIG. 2 illustrates, in more detail, laser 102. More specifically, laser 102 includes a laser head 112. As known in the art, laser head 112 includes a laser crystal (not shown), flashlamps (not shown), and a reflector (not shown) and may, for example, be a laser head commercially available from Control Laser, Orlando, Fla. The laser head may also be a total internal reflection face pumped laser such as described in detail in commonly assigned Martin, U.S. Pat. No. 3,633,126 and Jones, U.S. Pat. No. 4,681,396.

Aligned with laser head 112 is a first frequency double crystal 114 and a second frequency double crystal 116. These frequency double crystals are well known in the art and may, for example, be frequency double crystals commercially available from INRAD, Quantronix, etc. Each frequency double crystal operates so as to double the frequency of an input beam which results in halving the wavelength of the input beam. The specific configuration of the frequency double crystals typically is selected based upon the type of composite object to be processed. Specifically, the selected energy wavelength depends upon a wavelength which the material to be processed will absorb rather than reflect. It should be understood, therefore, that the number of frequency double crystals and their configuration will depend upon the material to be processed.

In operation of laser 106 shown in FIG. 2, a first beam 118 having a wavelength $\lambda$ is emitted from laser head 112 and is intercepted by first frequency double crystal 114. As an example, if an ND:YAG crystal is used in laser head 122, the initial wavelength $\lambda$ will be 1.06 micrometers. A second beam 120 having a wavelength of $\lambda/2$ is emitted from first frequency double crystal 114. Second beam 120 is intercepted by second frequency double crystal 116 which, in turn, emits a beam 122 having a wavelength of $\lambda/4$. Beam 122 then could be focused on a composite object, as shown in FIG. 1, which absorbs energy having a wavelength of $\lambda/4$ (266 nanometers) to perform materials processing.

A layered composite object was cut utilizing the embodiment of the present invention shown in FIGS. 1 and 2. Specifically, a commercially available laser head from Control Laser, including an Nd:YAG crystal rod, was utilized as part of the laser source. The laser source also included first and second frequency double crystals as shown in FIG. 2. Beam 122 had a wavelength of substantially 266 nanometers and was operated at pulse repetition rate between two and three kilohertz (kHz). The pulse repetition rate, of course, may be increased to within system constraints, such as 10 kHz. The pulse width length was approximately 100 nanoseconds. The average power level of beam 166 was substantially 22 milliwatts. The focusing lens was a 40 millimeter focal length lens. Configured in this manner, the composite object was cut with substantially clean edges and without substantially damaging any layer of the composite object.

It should be understood, of course, that laser head 112 could be one of many types of laser heads which are commercially available. In addition to lasers previously discussed, the laser could also be, for example, an excimer laser operating at, for example, an UV wavelength of 248 nanometers.

To align beam 122 with the composite object portion to be processed, the laser may be operated at a low power level. The orientation of a low power "alignment beam" emitted from the laser in this condition may then be adjusted relative to the orientation of the composite object such as by adjusting the orientation of the focusing lens. The focusing lens, of course, is disposed in the low power beam optical path. Once aligned, the laser may be operated in its material processing mode.

FIG. 3 illustrates a top view of a plurality of composite object elements 124, 126, 128, 130 and 132 which, prior to processing, formed composite object 100. It should be understood, of course, that the shape, size and other geometrical characteristics of each composite object element may vary as desired.

There are many well known composite objects and methods and means for providing such composite objects. An example of a layered composite object 200 is shown in FIG. 4. Note that the composite object shown in FIG. 4 is not the composite object which was cut as described with reference to FIGS. 1 and 2. It is believed, however, that composite object 200 could be processed in accordance with the present invention. Composite object 200 is shown for illustrative purposes. Object 200 includes a first protective layer 202, a second specularly reflecting layer 204, a third clear layer 206 and a fourth adherent layer 208. Composite object 200 is described in more detail in U.S. Pat. No. 4,720,426 which is assigned to the present assignee and incorporated herein, in its entirety, by reference.

Figure 5:
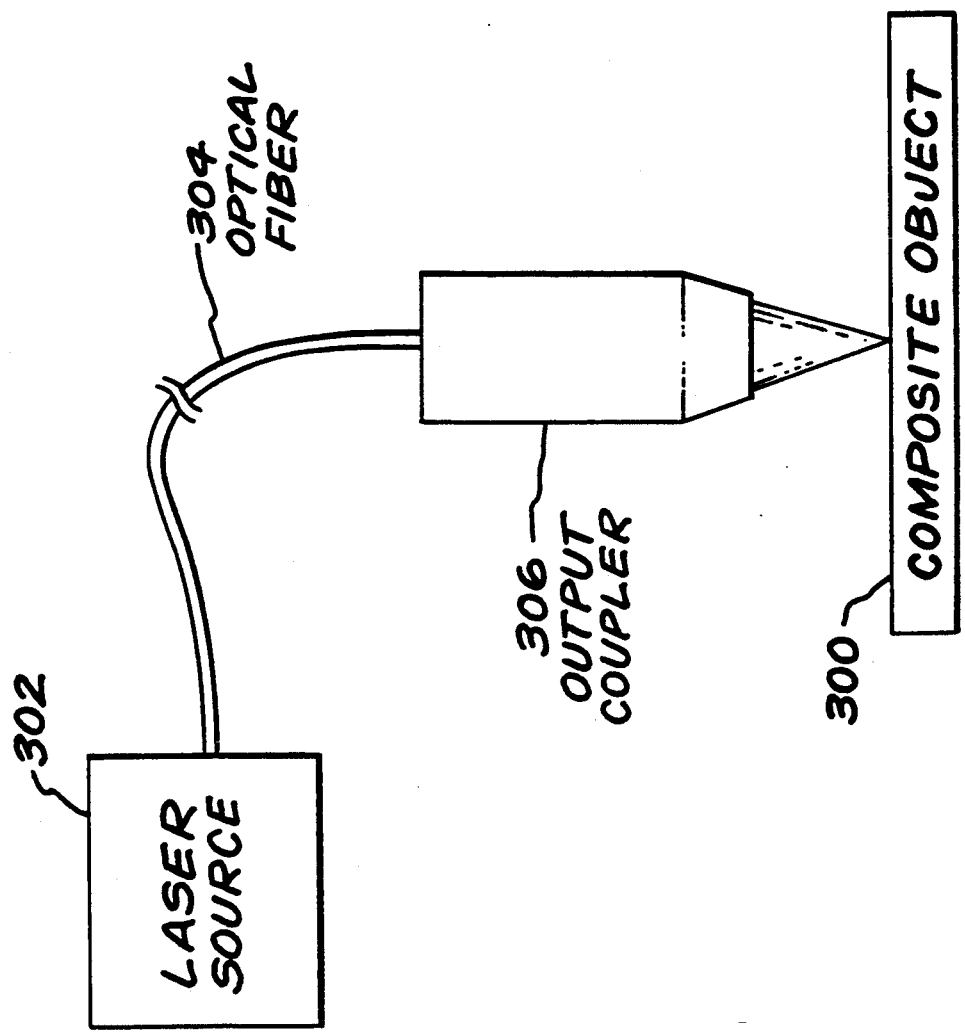
FIG. 5 illustrates, in block diagram, a second embodiment of the present invention shown operating to process a composite object.

A second embodiment of the present invention is illustrated in FIG. 5. In the embodiment illustrated in FIG. 5, the present invention is shown processing a composite object 300. Although not shown, a translation table and computer may also be used in the second embodiment as illustrated with regard to the first embodiment. The second embodiment includes a laser source 302, an optical fiber 304 and an output coupler 306. The manner of injecting a laser beam from laser source 302 into an optical fiber is described in Jones, U.S. Pat. No. 4,681,396 which is incorporated herein, in its entirety, by reference. The optical fiber transmits a beam from laser source 302 to output coupler 306. In some operations, utilizing the second embodiment illustrated in FIG. 5 may be preferrred so as to increase the ease of adjusting the position of the processing beam relative to the composite object. Specifically, the output coupler may be mounted to a robotic arm as is well known in the art.

While the present invention has been described with respect to specific embodiments, many modifications, variations, substitutions and equivalents will be apparent to workers in the art. Accordingly, it is intended that the invention be limited only by the spirit and scope of the appended claims.

What is claimed is:

1. A method comprising the steps of:
providing a flexible composite material the composite material being a layered composite material and each layer of the composite material having respective optical, mechanical, and thermal properties;
aligning a laser source with a portion of the composite material to be processed;

operating the laser source to generate laser beam pulses; and forming separate composite material elements by applying the pulses of beams from the source to the composite material portion to be processed.

2. A method in accordance with claim 1 wherein aligning the laser source comprises the steps of:

operating the laser source so that a low power alignment beam is generated; and adjusting the orientation of the low power alignment beam relative to the portion of the object to be processed.

3. A method in accordance with claim 2 wherein adjusting the orientation of the low power alignment beam comprises the step of:

adjusting the orientation of a focusing lens relative to the composite object, the focusing lens being disposed in the laser source beam optical path.

4. A method in accordance with claim 1 wherein the laser source includes a laser head, an optical fiber and an output coupler, the optical fiber being disposed to transmit laser beam pulses emitted from the laser head to the output coupler, and aligning the laser beam emitted from the output coupler comprises the step of:

adjusting the orientation of the output coupler relative to the composite object portion to be processed.

5. A composite object element formed in accordance with the method recited in claim 1.

6. An apparatus for creating at least two separate composite objects from at least one homogeneous composite object, said apparatus comprising:

a flexible composite material means being homogeneous layered composite material and each layer of the composite material having respective optical, mechanical, and thermal properties;

means for aligning a low power beam emitted from a laser source with a portion of the homogeneous composite material to be processed, said aligning means comprising means for operating the laser source so that a low power alignment beam is generated and means for adjusting the orientation of the low power alignment beam relative to the portion of the material to be processed;

means for generating laser beam pulses, the laser beam pulses being substantially coaxial with said previously generated low power alignment beam; and means for forming separate composite material elements including means for applying the pulses of beam to the composite material portion to be processed.

7. An apparatus in accordance with claim 6 wherein said laser source comprises an excimer laser configured to generate laser beam pulses having a wavelength of substantially 248 nanometers.

* * * * *